United States Patent
Spatafora et al.

(10) Patent No.: US 8,096,096 B2
(45) Date of Patent: Jan. 17, 2012

(54) MACHINE FOR PACKAGING PRODUCTS IN WRAPPERS OF SHEET MATERIAL

(75) Inventors: Mario Spatafora, Granarolo (IT); Salvatore Carboni, Bologna (IT)

(73) Assignee: G.D. S.p.A. (IT)

( * ) Notice: Subject to any disclaimer, the term of this patent is extended or adjusted under 35 U.S.C. 154(b) by 357 days.

(21) Appl. No.: 12/320,675

(22) Filed: Feb. 2, 2009

(65) Prior Publication Data

US 2009/0193758 A1 Aug. 6, 2009

(30) Foreign Application Priority Data

Feb. 6, 2008 (IT) .............................. BO2008A0076

(51) Int. Cl.
*B65B 51/10* (2006.01)

(52) U.S. Cl. .......... 53/374.3; 53/376.2; 53/442; 53/463; 53/557

(58) Field of Classification Search ................. 53/374.3, 53/376.2, 442, 441, 463, 557
See application file for complete search history.

(56) References Cited

U.S. PATENT DOCUMENTS

| | | | | |
|---|---|---|---|---|
| 2,438,089 A * | 3/1948 | Carson | | 53/410 |
| 2,841,820 A * | 7/1958 | Pfeiffer | | 26/72 |
| 3,166,462 A * | 1/1965 | Schoder | | 156/499 |
| 3,589,099 A * | 6/1971 | James | | 53/526 |
| 4,004,963 A * | 1/1977 | Denker | | 156/583.5 |
| 4,080,241 A | 3/1978 | Grevich et al. | | |
| 4,541,889 A * | 9/1985 | Held | | 156/583.5 |
| 4,641,482 A * | 2/1987 | Metz | | 53/387.3 |
| 5,378,304 A | 1/1995 | Denker | | |
| 6,908,295 B2 * | 6/2005 | Thielman et al. | | 425/371 |
| 7,323,666 B2 * | 1/2008 | Spohn et al. | | 219/620 |
| 2004/0081843 A1 * | 4/2004 | Bunyan | | 428/517 |

FOREIGN PATENT DOCUMENTS

EP 1702848 9/2006
WO 02/085711 10/2002

OTHER PUBLICATIONS

European Search Report dated Apr. 30, 2009 from counterpart European patent application.

* cited by examiner

*Primary Examiner* — Hemant M Desai
(74) *Attorney, Agent, or Firm* — Timothy J. Klima; Shuttleworth & Ingersoll, PLC

(57) ABSTRACT

In a packaging machine, typically a cellophaner for overwrapping packets of cigarettes, each of the packets is enveloped by a wrapping unit in a heat shrinkable wrapper presenting at least two opposite faces disposed parallel one with another. The machine also comprises a unit by which heat is applied to the wrappers, equipped with a pair of belt conveyors that present two branches, facing one another and set in motion in such a way as to transport the packets by gripping the two opposite faces of each wrapper, and at least one heating head associated with each transport branch; the heating heads are faced with a leaf of lamellar graphite bonded to the head on one side and offered in direct contact on the other to the respective branch of the corresponding belt conveyor, so as to minimize friction between the belt and the head.

21 Claims, 3 Drawing Sheets

MACHINE FOR PACKAGING PRODUCTS IN WRAPPERS OF SHEET MATERIAL

BACKGROUND OF THE INVENTION

The present invention relates to a machine for packaging products in wrappers of sheet material.

The present invention finds application in cigarette packers and in cartoners, by which groups of cigarettes and groups of packets of cigarettes, respectively, are enveloped in sheets or blanks of paper material.

Similarly, the present invention finds application in cellophaners, or overwrapping machines generally, by which packets of cigarettes or groups of packets are enveloped in sheets of thermoplastic material.

Cigarette packers and cartoners typically comprise a wrapping unit equipped with folding devices, designed to envelop packets and cartons in wrappers generally of parallelepiped geometry.

Similarly, overwrappers and cellophaners comprise a wrapping unit by which a packet or a group of packets is enveloped in a sheet of thermoplastic material, in such a way as to cover the four side faces and the two end faces of the aforementioned wrappers with an outer layer of transparent material; the resulting overwrap is then rendered stable by sealing devices positioned to apply a longitudinal seal along one of the side faces and two further seals coinciding with the two end faces.

The machines mentioned above are equipped at the outfeed stage with a conditioning or treatment station where the wrappers are subjected to the application of heat.

The purpose of the treatment in question is to induce a reactivation of hot melt adhesive or to dry an adhesive more quickly, in the case of paper wrappers, or, in the case of overwrapping machines, to induce shrinkage in a covering of thermoplastic material and cause it to hug the packet or group of packets more tightly, thereby eliminating any kinks and creases.

These heat treatment operations are brought about during the passage of the packets or cartons along an outfeed channel created between two mutually opposed branches of a pair of looped belt conveyors.

The aforementioned branches are breasted in contact on one side with two opposite faces of the single wrappers, while sliding in contact on the other side with a source of heat provided by a respective metal plate, heated to a predetermined temperature by electric elements embedded in the selfsame plate.

Machines equipped with the aforementioned heat treatment station betray a serious drawback deriving from high thermal inertia in the metal body of the heated plate, the negative effects of which include, on the one hand, insufficient heat output for the purposes of reactivating or drying an adhesive, or inducing heat shrinkage, and on the other, the risk of wrapping materials being scorched.

An additional drawback derives from the sliding interaction, and consequent frictional contact, between the belt conveyors and the respective heating plates.

Self-evidently, this friction is a cause of wear on the belt conveyors, especially at the high operating speeds typical of modern packaging machines.

The object of the present invention is to provide a machine for packaging products in wrappers of sheet material, such as will be unaffected by the drawbacks mentioned above with reference to the prior art.

SUMMARY OF THE INVENTION

The stated object is realized according to the present invention in a machine for packaging products in wrappers of paper or film material, comprising a unit by which each product is enveloped in a wrapper presenting at least two opposite faces disposed substantially parallel one with another, and equipped with a unit by which the wrappers are subjected to a heat treatment; the heat treatment unit comprises a transport channel along which the products advance enveloped in respective wrappers, created between two belt conveyors with respective branches disposed facing one another and set in motion in such a way as to convey the products by gripping the two opposite faces of the wrapper, and at least one heating head associated with each transport branch, furnished with a leaf of dry lubricant offered in direct contact to the branch of the respective belt conveyor.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
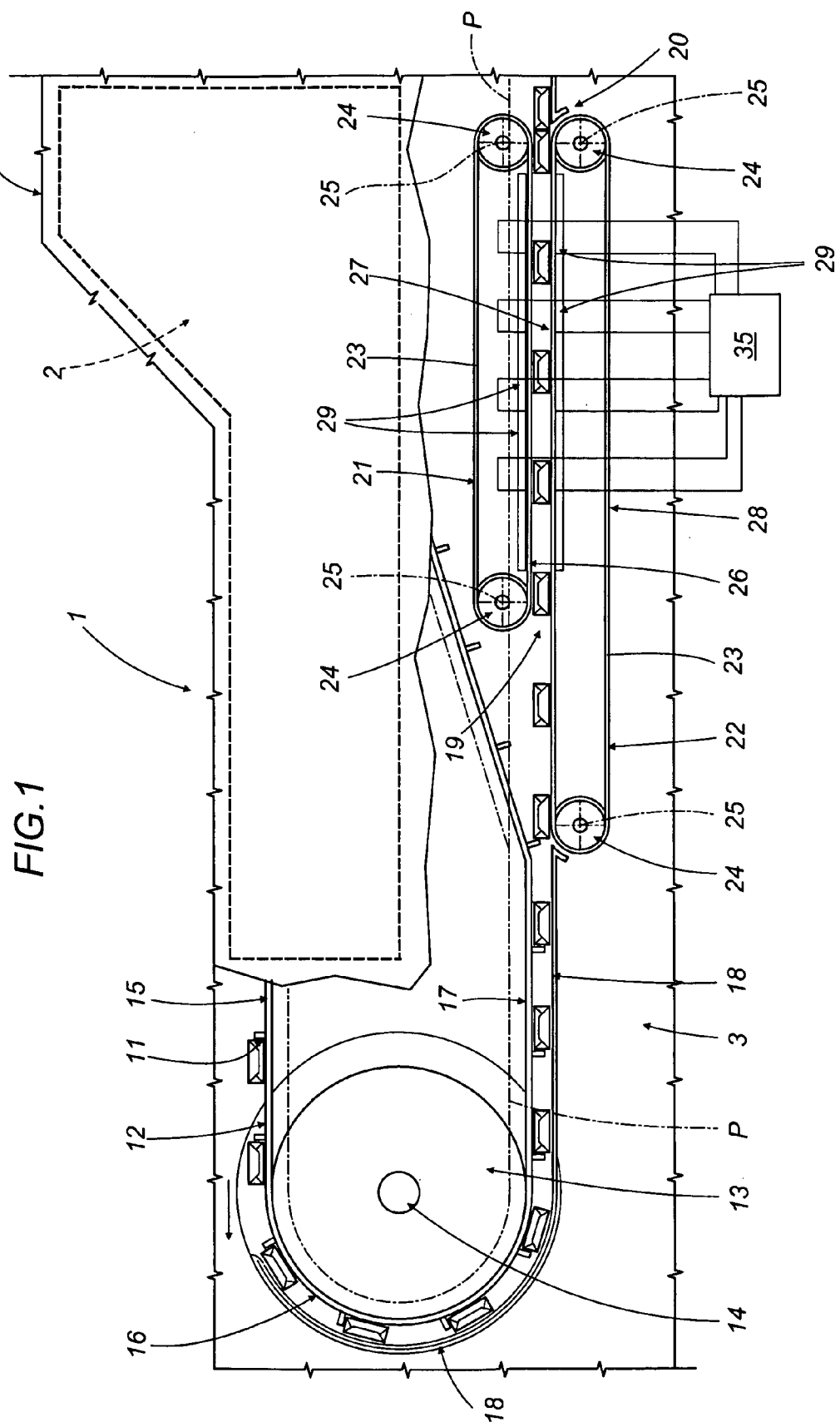
FIG. 1 illustrates an overwrapping machine equipped with the device according to the present invention, viewed schematically in a side elevation.
Figure 1A:
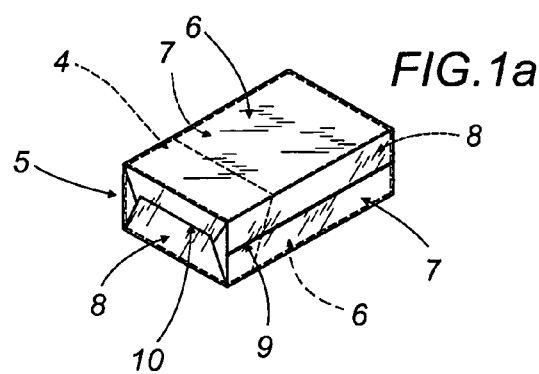
FIGS. 1a and 1b are enlarged views showing an overwrapped packet, and a detail of the overwrapping machine illustrated in FIG. 1.

With reference to FIG. 1, numeral 1 denotes a machine, in its entirety, for packaging products in wrappers of sheet material, and in particular a cellophaner, or overwrapper, equipped with a wrapping unit denoted 2.

The wrapping unit 2, conventional in embodiment and therefore schematized as a block, is mounted to a vertical bulkhead 3 of the machine frame.

The wrapping unit 2 serves to envelop products 4, consisting in packets of cigarettes presenting a substantially parallelepiped shape and of rectangular section, in respective wrappers 5 of heat shrinkable transparent thermoplastic material.

Each wrapper 5 presents two larger side faces 6 and two smaller side or flank faces 7 extending in a longitudinal direction, and two end faces 8 disposed transversely to the side faces.

On exiting the unit 2, the wrappers 5 are closed and secured by a longitudinal seal 9 along one flank, and by two end seals 10, then inserted edgeways-on into the pockets 11 of an endless conveyor 12 looped around pulleys 13 of which one is illustrated in FIG. 1, rotatable on a pivot 14 projecting from the bulkhead 3.

The conveyor 12 extends along a path P presenting a horizontal top leg 15, a curved leg 16 passing round the pulley 13, and a horizontal bottom leg 17, and operates in combination with fixed guide members 18 to transfer the packets 4, enveloped in respective wrappers 5, along a feed direction denoted F, advancing transversely to their longitudinal axes and toward a horizontal transport channel 19 leading into an outfeed station 20.

The transport channel 19 is created by means of two belt conveyors 21 and 22 positioned one above the other and extending along the feed path P, each comprising a belt 23 of metal or silicone material looped around a pair of pulleys 24, one of which power driven, mounted to the bulkhead 3 and turning on horizontal axes 25 disposed transversely to the feed path P.

Figure 1B:
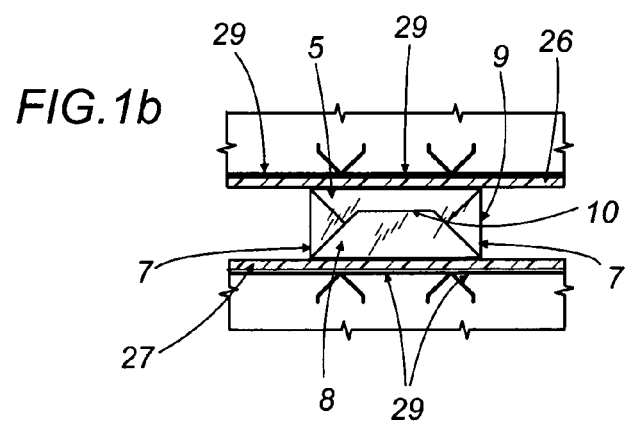

As discernible also from FIG. 1b, the transport channel 19 is delimited by two horizontal branches 26 and 27 of the aforementioned conveyors, 21 and 22 respectively, along which packets 4 enveloped in respective wrappers 5 are advanced toward the outfeed station 20 by inducing direct contact between the belts and the two larger side faces 6.

Downstream of the wrapping unit 2, the machine 1 comprises a heat treatment unit 28 incorporating the transport channel 19, and heater means consisting of 2n heating heads 29 ("n" denoting a whole number equal to or greater than 1), installed in identical number for each belt and offered in contact to corresponding surfaces of the two branches 26 and 27 directed away from the channel 19.

FIG. 1 illustrates a plurality of heads 29 arranged in succession along the one branch 26 and a plurality of heads 29 arranged in succession along the other branch 27.

Figure 2:
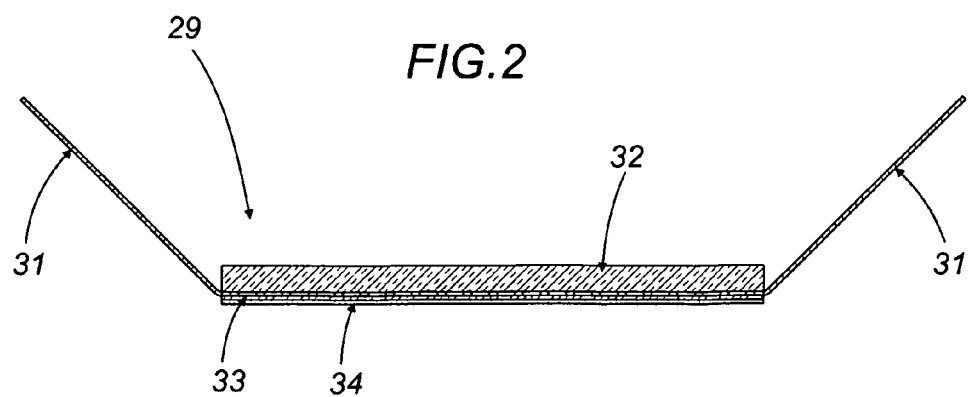
FIG. 2 shows a detail of FIG. 1, enlarged and viewed from one side.
Figure 3:
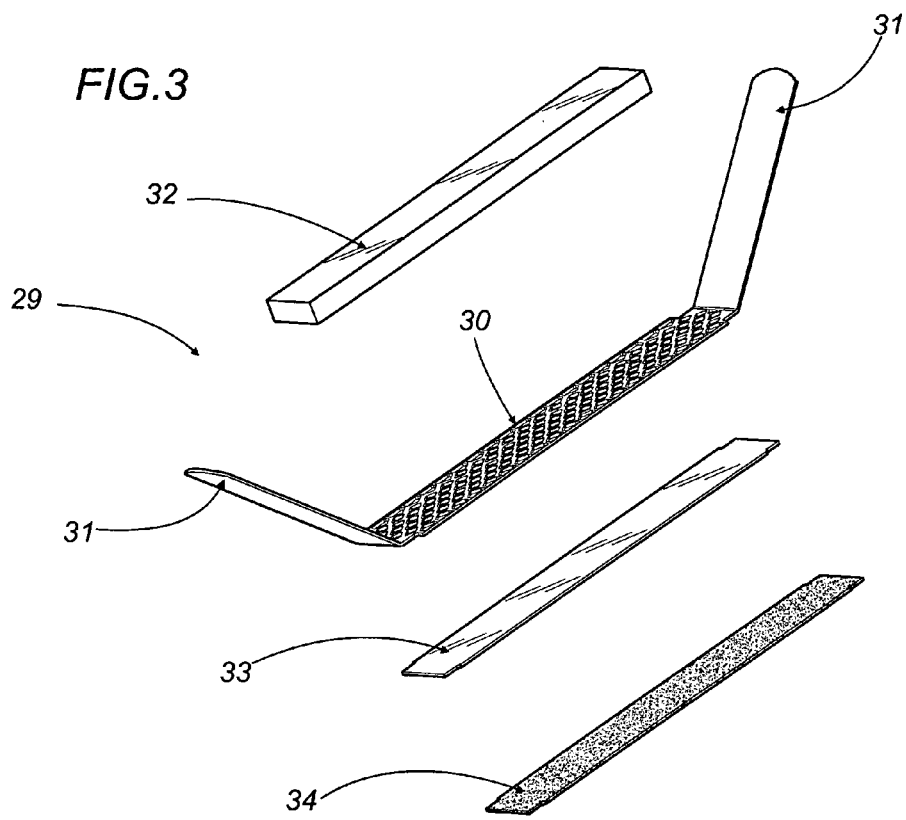
FIG. 3 shows the detail of FIG. 2 in an exploded view.

With reference to FIGS. 2 and 3, each head 29 comprises an electrically conductive heating foil 30 of rectangular outline coupled by two connectors 31, projecting from its opposite ends, to a source of electrical power (not illustrated).

With the exception of the two connectors 31, the foil 30 is pierced, presenting a mesh structure of thickness less than 0.4 millimeters, and preferably of the order of 0.1 millimeter, designed to minimize its thermal inertia as far as possible.

Each head 29 comprises a backing element 32, breasted in contact with the face of the foil 30 directed away from the channel 19, and a first overlay 33 breasted in contact with the face of the foil 30 directed toward the channel 19.

The heating heads 29 are mounted to the bulkhead 3 of the machine by support means (not illustrated) associated with the backing elements 32.

Each backing element 32 consists in a block of ceramic material.

Alternatively, each backing element 32 could consist in a block of silicone.

As a further alternative, each backing element 32 could consist in a material of multilayer structure, part ceramic and part silicone.

The first overlay 33 is an electrically insulating layer provided by a coating of ceramic material less than 0.4 millimeters thick, and preferably of the order of 0.1 millimeter thick.

The first overlay 33 covers the heat-emitting mesh surface of the foil 30 in its entirety, while also providing the means by which the foil is secured to the backing element 32. To retain the foil 30 on the backing element 32, more exactly, the material of the first overlay 33 penetrates the holes presented by the aforementioned mesh structure, passing from one face of the foil 30 through to the other.

Also forming part of the head 29, finally, interposed between the branch 26 or 27 of the relative belt and the first overlay 33 and adhering to both, is a leaf of dry lubricant 34 consisting in lamellar graphite and advantageously, albeit implying no limitation, of thickness less than 2 millimeters.

Ideally, the thickness of the leaf 34 will be equal to or less than 1 millimeter.

In particular, the leaf 34 is bonded to the first overlay 33 with adhesive, in such a way as to provide the head 29 with a second overlay.

The heat treatment unit 28 according to the present invention is characterized by extremely low thermal inertia and, in addition, offers the facility of extremely precise temperature control.

To this end, as illustrated diagrammatically in FIG. 1, the unit 28 comprises an electronic control unit 35 such as will regulate the current applied to the heating heads 29 and/or selectively activate a given number of heads 29 at any one time, according to the linear velocity of the conveyors 21 and 22.

Consequently, the unit is able to induce a correct and uniform heat shrink action and ensure that the wrappers 5 are drawn perfectly tight around the packets 4, without any risk of burning or creasing the overwrap material.

By including the leaf of lamellar graphite 34, moreover, it becomes possible to minimize the effects of wear resulting from frictional contact between the heating heads 29 and the belt conveyors 21 and 22.

Figure 4:
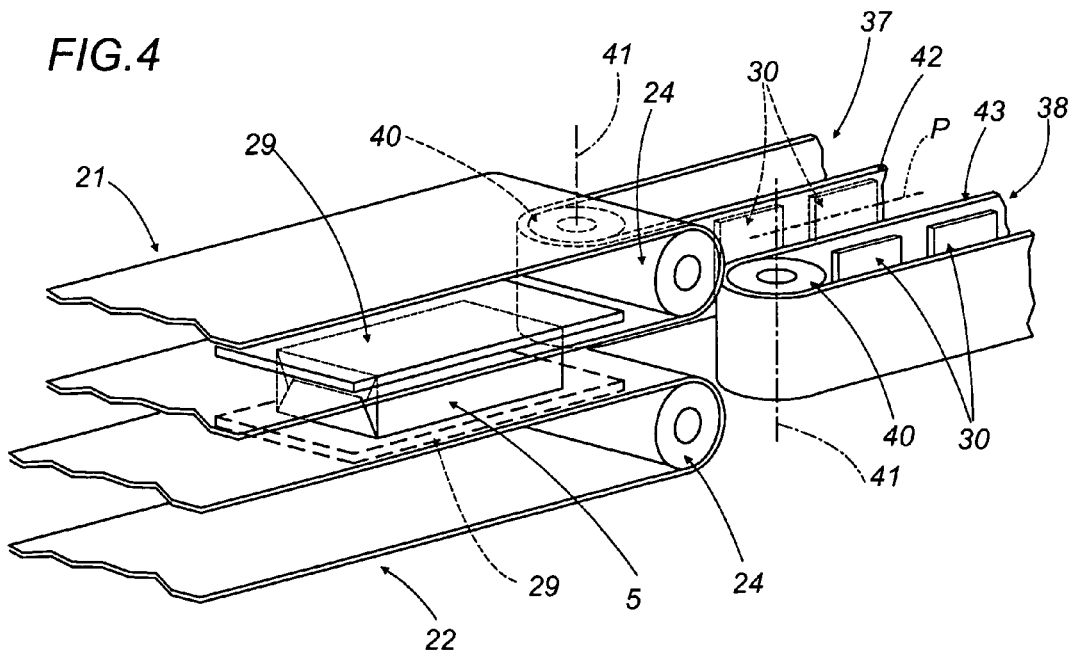
FIG. 4 shows an alternative embodiment of the device according to present invention, illustrated schematically and in perspective.

In the example of FIG. 4, the heat treatment is applied to both pairs of side walls presented by the wrapper 5 which, to reiterate, appears parallelepiped in shape.

In this instance the heat treatment unit 28 comprises a second transport channel 36, interposed between the channel 19 first mentioned and the outfeed station 20, created between two belt conveyors 37 and 38 facing one another and extending along the feed path P, each comprising a belt 39 of metal or silicone material looped around a pair of pulleys 40, one of which power driven, rotating about vertical axes 41.

Two respective branches 42 and 43 of these two further belt conveyors 37 and 38, disposed facing one another and orthogonal to the branches 26 and 27 first mentioned, are heated by respective heads 29 and combine to create the aforementioned second transport channel 36, along which packets 4 enveloped in respective wrappers 5 are advanced toward the outfeed station 20 by inducing direct contact between the belts and the two smaller or flank faces 7.

In the case of a cigarette packer or cartoner, the heat treatment unit according to the present invention can be used to secure the overlapping folds of wrappers having a hot melt adhesive applied to the selfsame folds, which will be reactivated by the heat emitted from the heads 29.

Another function that can be performed by the heat treatment unit according to the present invention in a cigarette packer or cartoner is to accelerate the drying time of the adhesive.

What is claimed is:

1. A machine for packaging products in wrappers sheet material, comprising:
    a wrapping unit by which each product is enveloped in a wrapper and having at least two opposite faces disposed substantially parallel one with another;
    a unit by which the wrappers are subjected to a heat treatment, comprising a transport channel along which the products advance enveloped in respective wrappers, created between two conveyors with respective transport branches disposed facing one another and set in motion in such a way as to convey the wrappers by engaging in contact with a respective face of the wrapper, and at least one heating head associated with each transport branch, furnished with a leaf of dry lubricant offered in direct contact to the branch of the respective conveyor;
    wherein the heating head comprises a backing element, an electrically conductive heating foil positioned over the backing element, a first electrically insulating overlay positioned over the heating foil, and a second overlay provided by the leaf of dry lubricant, positioned over the first overlay.

2. A machine as in claim 1, wherein the leaf of dry lubricant includes a lamellar graphite.

3. A machine as in claim 1, wherein the second overlay is bonded to the first overlay with adhesive.

4. A machine as in claim 3, wherein the thickness of the second overlay is less than 2 millimeters.

5. A machine as in claim 3, wherein the thickness of the second overlay is less than 1 millimeter.

6. A machine as in claim 5, wherein the first overlay includes a coating of ceramic material.

7. A machine as in claim 6, wherein the thickness of the first overlay is less than 0.4 millimeters, and in a preferred embodiment substantially 0.1 millimeter.

8. A machine as in claim 7, wherein the first overlay covers the working surface of the heating foil in its entirety.

9. A machine as in claim 8, wherein the heating foil includes a mesh structure, at least in part.

10. A machine as in claim 9, wherein the heating foil is secured to the backing element by the first overlay.

11. A machine as in claim 10, wherein the heating foil is secured to the backing element by causing the material of the first overlay to penetrate the openings of the mesh structure and pass from one face of the foil through to an other.

12. A machine as in claim 11, wherein the thickness of the heating foil is less than 0.4 millimeters.

13. A machine as in claim 12, wherein the backing element is fashioned from ceramic material, at least in part.

14. A machine as in claim 12, wherein the backing element is fashioned from silicone, at least in part.

15. A machine as in claim 14, wherein the heat treatment unit comprises a plurality of heating heads ordered in succession along the branches delimiting the transport channel.

16. A machine as in claim 15, wherein the heating foil is connected to an electrical circuit that comprises a control unit allowing selective activation of the heads, interlocked to a system for controlling the speed of the conveyors.

17. A machine as in claim 16, comprising two successive transport channels along which the wrappers advance, created between mutually opposed branches of respective pairs of belts, wherein the mutually opposed branches of the second pair of belts extend orthogonally to the mutually opposed branches of the first pair, in such a way as to make contact with a second pair of faces presented by the wrapper.

18. A machine as in claim 17, wherein the machine is a packer or a cartoner, and the heat treatment unit serves to secure the overlapping folds of wrappers having a hot melt adhesive applied to the folds and reactivatable by the heating heads.

19. A machine as in claim 17, wherein the machine is an overwrapper or cellophaner, and the heat treatment unit serves to tighten wrappers of heat shrinkable material around the respective packets.

20. A machine as in claim 12, wherein the thickness of the heating foil is substantially 0.1 millimeter.

21. A heat treatment unit, comprising at least one heating head as in claim 1.

* * * * *